(12) United States Patent
Ren et al.

(10) Patent No.: US 9,210,475 B2
(45) Date of Patent: Dec. 8, 2015

(54) KEY WORD BASED MEDIA CONTENT SEARCHING

(71) Applicant: Verizon Patent and Licensing Inc., Basking Ridge, NJ (US)

(72) Inventors: Dahai Ren, Lincoln, MA (US); Ming Chen, Bedford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 154 days.

(21) Appl. No.: 13/848,840

(22) Filed: Mar. 22, 2013

(65) Prior Publication Data

US 2014/0289779 A1   Sep. 25, 2014

(51) Int. Cl.
| | |
|---|---|
| G06F 3/00 | (2006.01) |
| G06F 13/00 | (2006.01) |
| H04N 5/445 | (2011.01) |
| H04N 21/482 | (2011.01) |
| G06F 17/30 | (2006.01) |
| H04N 21/278 | (2011.01) |
| H04N 21/466 | (2011.01) |
| H04N 21/8405 | (2011.01) |

(52) U.S. Cl.
CPC ...... *H04N 21/4828* (2013.01); *G06F 17/30781* (2013.01); *H04N 21/278* (2013.01); *H04N 21/4668* (2013.01); *H04N 21/8405* (2013.01)

(58) Field of Classification Search
None
See application file for complete search history.

(56) References Cited

U.S. PATENT DOCUMENTS

| | | | |
|---|---|---|---|
| 2007/0203942 A1* | 8/2007 | Hua et al. | 707/104.1 |
| 2007/0214488 A1* | 9/2007 | Nguyen et al. | 725/134 |

* cited by examiner

*Primary Examiner* — Oschta Montoya

(57) ABSTRACT

A method may include receiving, from a user device, a search query associated with identifying media content items available from a service provider. A database of key words associated with a plurality of media content items is searched to identify a set of media content items having key words associated therewith that match the search query. It is determined, for each media content item in the set of media content items, whether the matching key word is a global key word representative of the media content item in its entirety, or a local key word representative of one or more portions of the media content item. The set of media content items based on the determining. The ranked set of media content items is transmitted to the user device for display to a user.

20 Claims, 7 Drawing Sheets

FIG. 3

| Title | Global Key Words | Chap | Local Key Words | Start | End |
|---|---|---|---|---|---|
| Mission Impossible | All Star Cast, Award Winner, Blockbuster, Action, Crime, Thriller, 90s, Secret Agents, Violent Content, Movie | | | | |
| | | 1 | Rivalry, Hitman, Hidden Identity, Nothing goes right | 0:00 | 16:33 |
| | | 2 | Rivalry, Assassination Attempt, Mind Game, On the Run, Car Chase, Moral Dilema | 16:34 | 36:42 |
| | | 3 | Mind Game, Brief Nudity, Obsessive Quest, Car Chase, Treasure Hunt | 36:43 | 55:20 |
| | | 4 | Rise to the Top, Treasure Hunt, Uncover Truth, Car Chase | 55:21 | 75:06 |
| | | 5 | Fall in Love, Brief Nudity, Fish out of Water, Car Chase, Destiny | 75:07 | 92:18 |
| Friends s02/e12 | Comedy, Guest Stars, Ensemble Cast | | | | |
| | | 1 | Monkey, San Diego Zoo, Search, Lost Love | 0:00 | 8:01 |
| | | 2 | Soap Opera, Stalker | 8:02 | 17:33 |
| | | 3 | Romance, Library, Bad Song | 17:34 | 22:00 |
| A Few Good Men | All Star Cast, Award Winner, Block Buster, Thriller, Military, Legal, 90s, Movie | | | | |
| | | 1 | Crime, Murder, Lawyer, Defense, Passed Over | 0:00 | 25:03 |
| | | 2 | Investigation, Cuba, Colonel, Code Red, Lawyer | 25:04 | 58:15 |
| | | 3 | Suicide, Red Tape, Trial | 58:16 | 80:47 |
| | | 4 | Confrontation, Trial, Code Red | 80:48 | 111:12 |
| | | 5 | Trial, Confession, Code Red | 111:13 | 138:00 |

KEY WORD BASED MEDIA CONTENT SEARCHING

BACKGROUND INFORMATION

Television service providers typically allow customers to search for content, such as programming content, video on demand (VOD) content, etc. However, due to limitations associated with the typical content search tool and the television interface, discovering content of interest is often difficult. As a result, customers often bypass using the search tool provided by the service provider.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to searching for live or currently airing programming content, such as broadcast or pay-per-view video content for display on a television. In an exemplary implementation, a content service provider may store key word metadata corresponding to discrete portions of the video content. The key words assigned to the portions are selected to include terms that are descriptive of the content in the corresponding portions. The portions corresponding to the video content may include the entire content, in which case the key words are referred to as global key words, or discrete portions of the video content each of which is less than the entirety, in which case the key words are referred to as local key words.

When a user wishes to find currently airing programming content view, the user provides a key word based search query, for example to a set top box associated with the service provider. In response to the query, a search engine searches the stored key word metadata and determines if the search query matches one of the stored key words assigned to one or more currently airing video content programs. If more than one content program having matching key words are identified, the search engine ranks the results based on several factors, such as whether the key word identified for a particular program is a global key word or a local key word, the portion of the program that is currently airing, etc. In this manner, the search engine may provide the most relevant search results to the user, thereby enabling a more enjoyable viewing experience.

Figure 1:
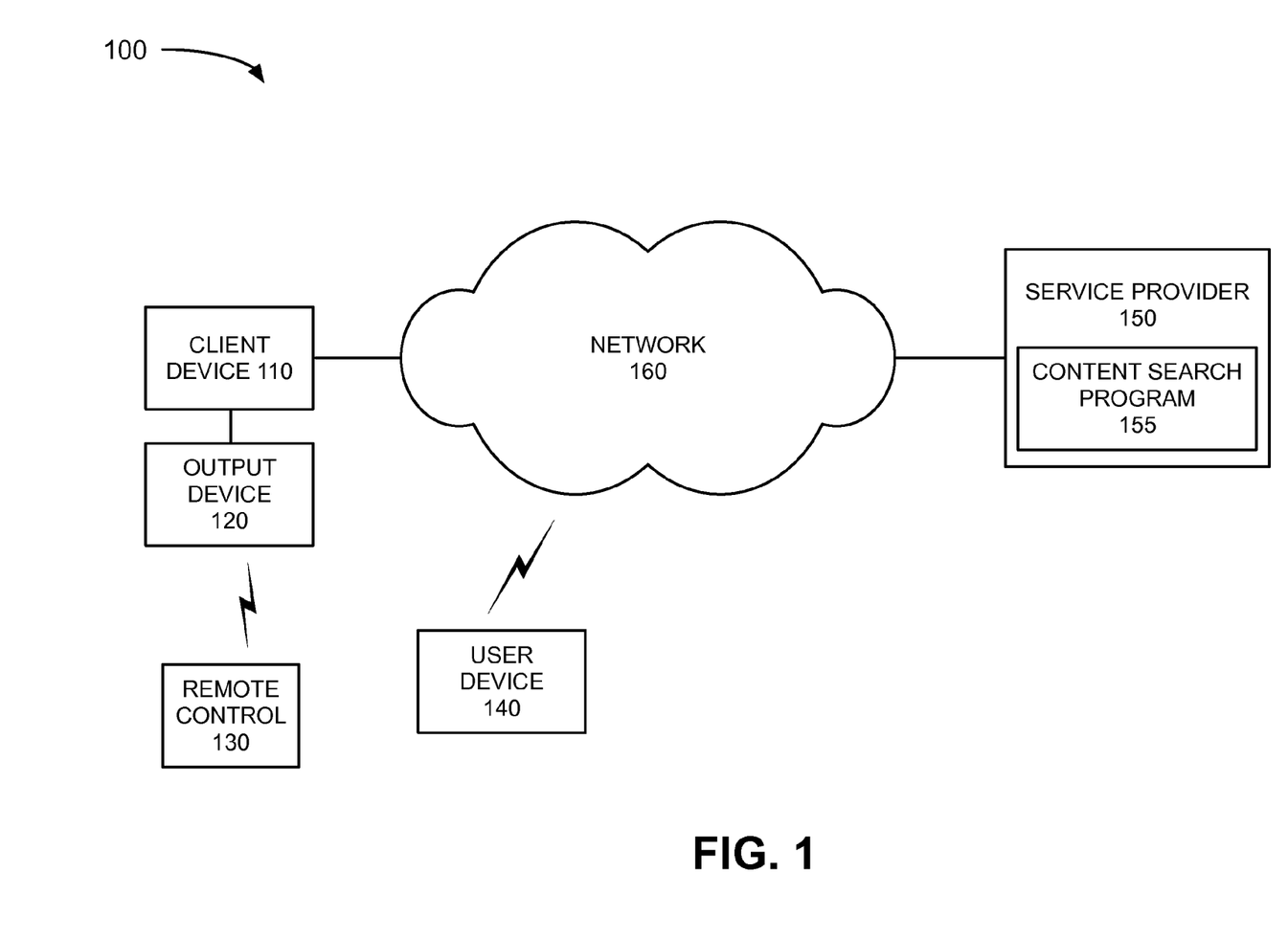
FIG. 1 illustrates an exemplary network in which systems and methods described herein may be implemented.

FIG. 1 is a block diagram of an exemplary network 100 in which systems and methods described herein may be implemented. Network 100 may include client device 110, output device 120, remote control 130, user device 140, service provider 150 and network 160.

Client device 110 may include any type of device that is able to receive data, such as text data, video data, image data, audio data, multi-media data, etc., transmitted from a source, such as service provider 150. Client device 110 may decode the data and output the data to an output device, such as output device 120, for viewing or playing. In an exemplary implementation, client device 110 may include a set top box (STB) used to decode incoming multi-media data, such as multi-media data received from a television service provider, a cable service provider, a satellite system, a wireless system or some other wired, wireless or optical communication medium. The term "set top box" as used herein should be construed to include any device used to receive signals from an external source and output the signals for viewing or playing. In some implementations, client device 110 may forward the decoded data for viewing or playing by another device, such as output device 120. In other implementations, client device 110 may play and display the decoded media.

For example, in some implementations, client device 110 may include some type of computer, such as a personal computer (PC), laptop computer, home theater PC (HTPC), a smart phone, a tablet computer, etc., that is able to receive incoming data and decode the incoming data for output to a display, which may be included with client device 110. In this instance, a client device 110 may include logic, such as a cable card, television card or other logic, to interface with service provider 150.

Output device 120 may include any device that is able to output/display various media, such as a television, monitor, PC, laptop computer, HTPC, a personal digital assistant (PDA), a web-based appliance, a mobile terminal (e.g., a cellular phone, a smart phone, tablet computer), etc. In an exemplary implementation, output device 120 may receive multi-media data from client device 110 and display or play the media.

Remote control 130 may include a device that allows a user to control programming (e.g., change channels) and/or content displayed on a television/output device via interaction with client device 110, such as via infrared (IR) signaling. Remote control 130 may also allow a user to search for various content provided by service provider 150, as described in detail below.

User device 140 may include a laptop computer, a tablet computer, a notebook computer, a PC, an ultra mobile personal computer (UMPC), a netbook, a game-playing device/console, or other types of computation or communication devices, threads or processes running on these devices, and/or objects executable by these devices. User device 140 may also include any type of communication device, such as a personal digital assistant (PDA) that can include a radio, a mobile telephone (e.g., a cell phone), a smart phone (e.g., that may combine a cellular radio with data processing and data communications capabilities), etc. In one implementation, user device 140 may include any device (e.g., an Internet Protocol (IP)-based device) that is capable of communicating via a network to request content.

User device 140 may also be configured to interact with and connect to other devices in network 100 (e.g., client device 110, output device 120, and/or a home router (not shown) via a local network (e.g., a home wired or wireless network). For example, user device 140 may connect to client device 110 and act as a remote control with respect to programming provided by client device 110, enter a search query to client device 110, etc. In other embodiments, user device 140 may connect to client device 110, where client device 110 is a home router. User device 140 may then receive and output content from the television service provider without involving a set top box or television. User device 140 may connect to network 160 via wired, wireless, or optical connections.

Service provider 150 may include one or more computing devices/systems, servers and/or backend systems that are able to connect to network 160 and transmit and/or receive information via network 160. In one implementation, service provider 150 may include a server (e.g., a computer system or an application), a cable head-end, and/or a broadcaster capable of providing content (e.g., TV programming, movies, video on demand (VOD) services, live television, news feeds, blog feeds, widgets, applications, etc.), advertisements, instructions, codes, encryption keys, and/or other information associated with products and/or services, etc., to client device 110 and user device 140.

Service provider 150 may also include content search program 155. In an exemplary implementation, content search program 155 may allow a user to search for content provided by service provider 150. For example, users may access content search program 155 via interaction with remote control 130 and/or user device 140 and search for content, as described in more detail below.

Network 160 may include one or more wired, wireless and/or optical networks that are capable of receiving and transmitting data, voice and/or video signals, including multimedia signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, although one client device 110, one output device 120, one remote control 130, one user device 140, one service provider 150, and one network 160 have been illustrated in FIG. 1, in practice, there may be more client devices 110, output devices 120, remote controls 130, user devices 140, service providers 150 and/or networks 160. Network 100 may also include additional elements, such as switches, gateways, routers, backend systems, etc., that aid in routing information, such as content or information from service provider 150 to client devices 110, output devices 120, remote control 130 and user device 140.

Further, various functions are described below as being performed by particular components in network 100. In other implementations, various functions described as being performed by one device may be performed by another device or multiple other devices, and/or various functions described as being performed by multiple devices may be combined and performed by a single device. For example, in some embodiments, elements of content search program 155 may be performed by client device 110 or user device 140.

Figure 2:
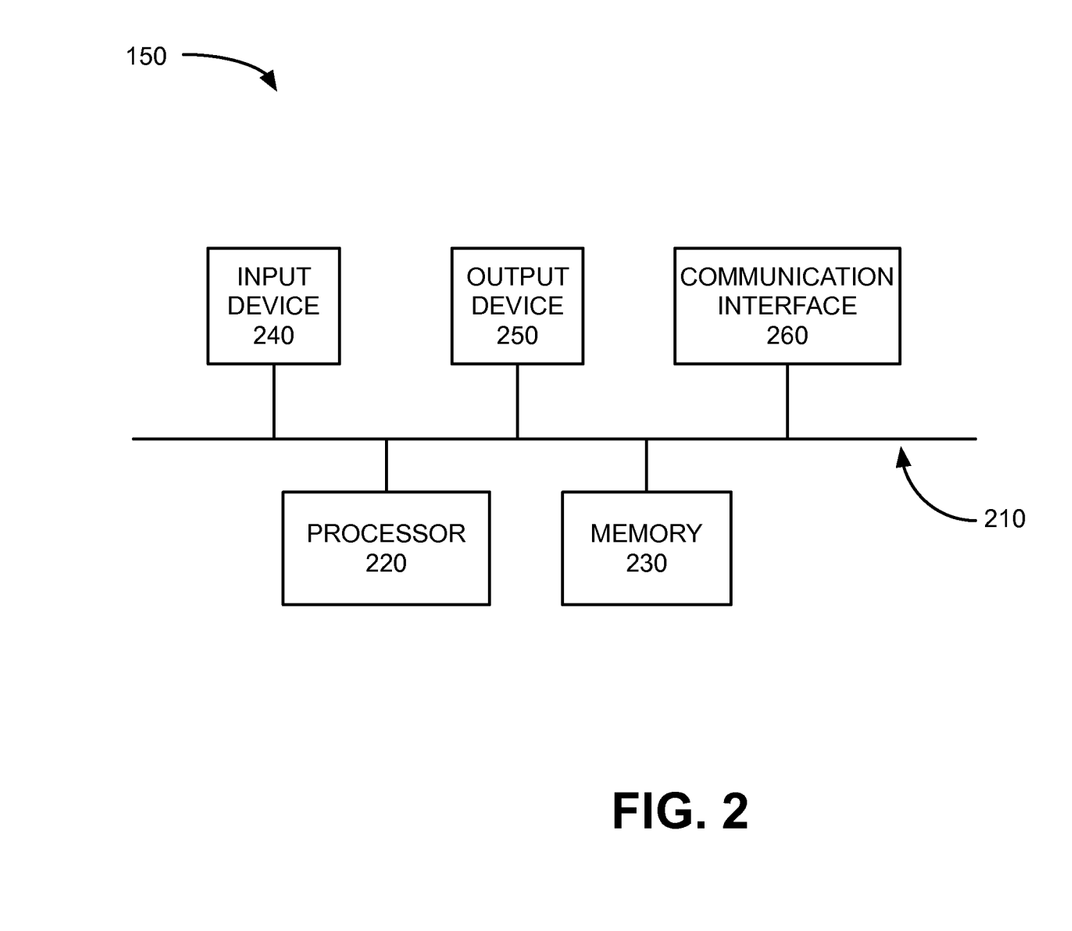
FIG. 2 illustrates an exemplary configuration of one or more of the devices of FIG. 1.

FIG. 2 illustrates an exemplary configuration of service provider 150. Other devices in network 100, such as client device 110, output device 120, remote control 130 and user device 140 may be configured in a similar manner. Referring to FIG. 2, service provider 150 may include bus 210, processor 220, memory 230, input device 240, output device 250 and communication interface 260. Bus 210 may include a path that permits communication among the elements of service provider 150.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to service provider 150, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc.

Communication interface 260 may include a transceiver that service provider 150 (or client device 110, output device 120, remote control 130 or user device 140) may use to communicate with other devices via wired, wireless or optical mechanisms. Communication interface 260 may also include one or more radio frequency (RF) transmitters, receivers and/or transceivers and one or more antennas for transmitting and receiving RF data via network 160. Communication interface 260 may also include a modem or an Ethernet interface to a LAN or other mechanisms for communicating with elements in a network, such as network 160 or another network.

The exemplary configuration illustrated in FIG. 2 is provided for simplicity. It should be understood that service provider 150 (or client device 110, output device 120, remote control 130 or user device 140) may include more or fewer devices than illustrated in FIG. 2. In an exemplary implementation, service provider 150 (or client device 110, output device 120, remote control 130 or user device 140) may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
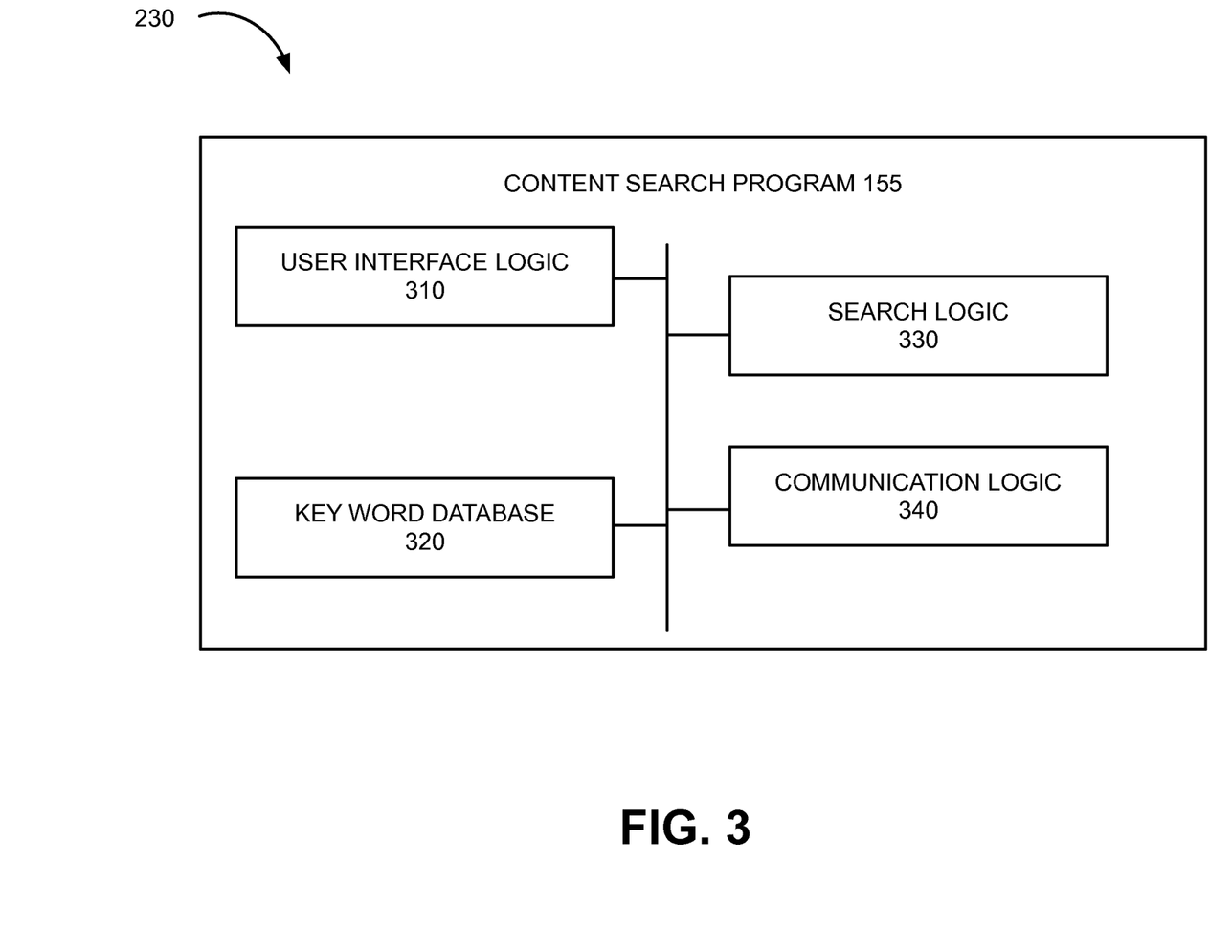
FIG. 3 illustrates an exemplary configuration of logic components implemented in the content search program of FIG. 1.

FIG. 3 illustrates an exemplary configuration of logic components implemented in content search program 155 of FIG. 1. In an exemplary implementation, all or some of the components illustrated in FIG. 3 may be stored in memory 230 and executed by processor 220. Referring to FIG. 3, content search program 155 may include user interface logic 310, key word database 320, search logic 330, and communication logic 340. Content search program 155 and its various logic components are described as being included in service provider 150. In alternative implementations, these components or a portion of these components may be located externally with respect to service provider 150. For example, in some implementations, one or more of the components of content search program 155 may be located in or executed by client device 110, output device 120, remote control 130 or user device 140.

User interface logic 310 may include logic to provide a user with an interface to enter information associated with identifying content and/or information of interest. For example, user interface logic 310 may include a graphical user interface (GUI) that allows a user to easily enter information, via remote control 130 or user device 140, to search for currently airing television content.

Key word database 320 may include one or more databases/tables of information identifying programs and other content available to users (also referred to herein as customers) and key word information associated with the available content. For example, key word database 320 may include a table that stores key word metadata associated with each item of available content or, as briefly described above, with specific portions of each content item (e.g., chapters). As an example, FIG. 4 illustrates an exemplary table 400 stored in database 320.

Figure 4:
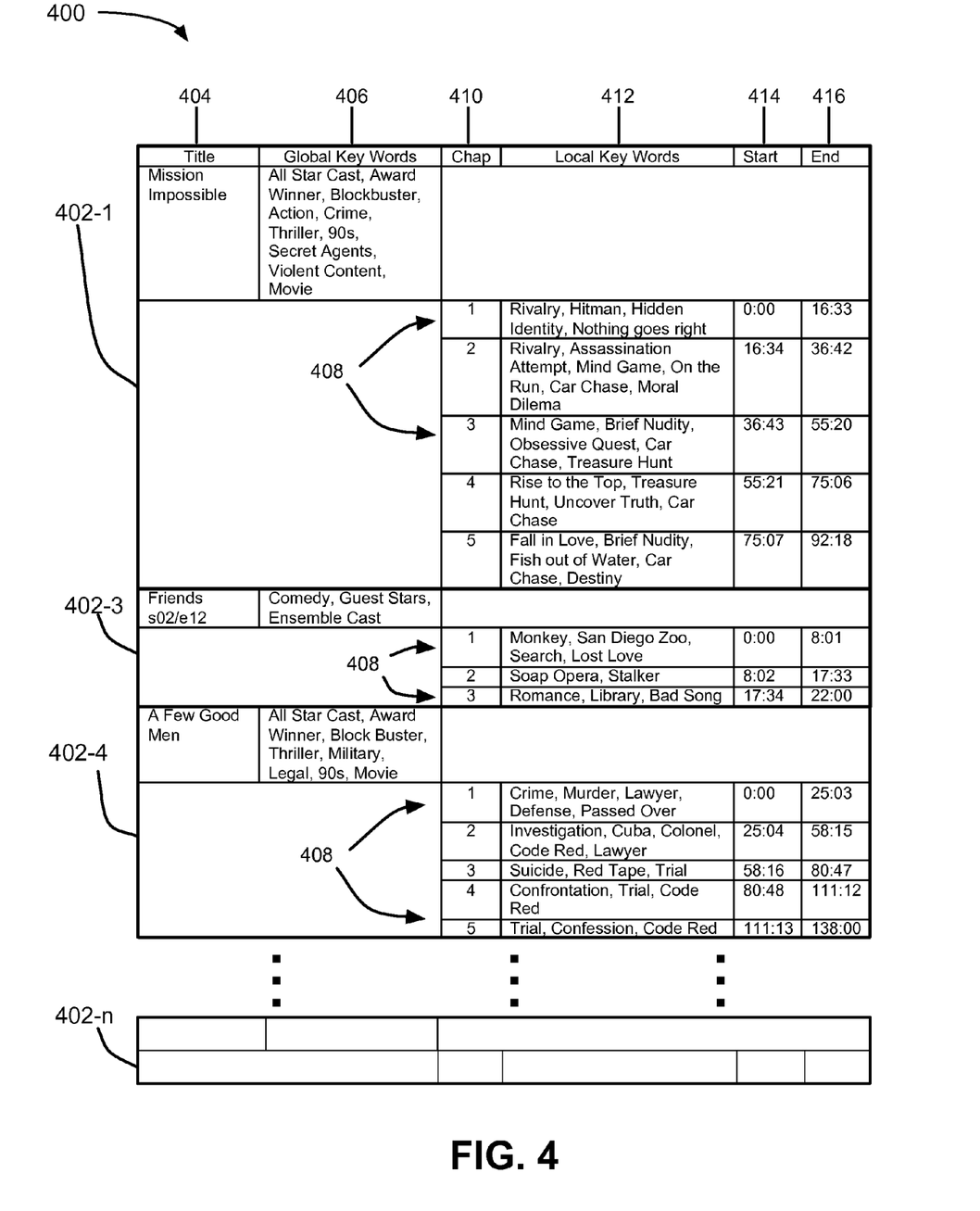
FIG. 4 illustrates an exemplary table used by the content search program of FIG. 3.

Referring to FIG. 4, table 400 includes a plurality of entries 402-1 to 402-*n* that correspond to individual content items (e.g., television programs or movies). Each entry 402 includes a title field 404, a global key words field 406, and a number of sub-entries 408 that correspond to discrete portions (i.e., chapters) for the particular content items. As used herein, the term chapter is generally defined to correspond to any time interval or content segment within a content item. Such time intervals may be uniform or variable and, in some instances, may comprise an entirety of the content item. Each sub-entry 408 includes, for example, chapter field 410, local key words field 412, start time field 414, and end time field 416. In other implementations, table 400 may include additional fields and/or other fields.

Title field 404 may include the title of the content, such as the movie title, television show title, etc. Global key words field 406 may include key words that are associated with the content item in its entirety (e.g., with each chapter in the content item). Chapter field 410 may include an indication of a chapter number within a particular content item. Local key words field 412 may include key words that are associated only with the particular chapter (i.e., identified in chapter field 410) of the content item. Start time field 414 may include an indication of a relative start time of a particular content chapter. End time field 416 may include an indication of a relative end time of a particular content chapter. For example, a first chapter in a content item may include a start time field value of 0:00 and an end time field value of 5:07, a second chapter in the content item may include a start time field value of 5:08 and an end time field value of 11:18, etc.

Referring back to FIG. 3, search logic 330 may include logic for identifying content based on a search query provided by the user. For example, search logic 330 may receive a search query via user interface logic 310, access key word database 400 to search for matching key words, rank the matching content items based on various factors, and provide the ranked search results to the user via user interface logic 310. In an exemplary implementation, search logic 330 may search global key words field 406 and local key words field 408 based on the received search query. As described in detail below, search logic 330 may rank the matching content items based on whether the matching key word is a global key word for the content item or a local key word for the content item, as well as based on the current playback position within the content item.

Communication logic 350 may include logic for communicating with other devices in network 100. For example, communication logic 350 may receive a search query via user interface logic 310 and forward the search query to search logic 340. Communication logic 350 may also forward search results generated by search logic 340 to the customer, as described in more detail below.

Figure 5:
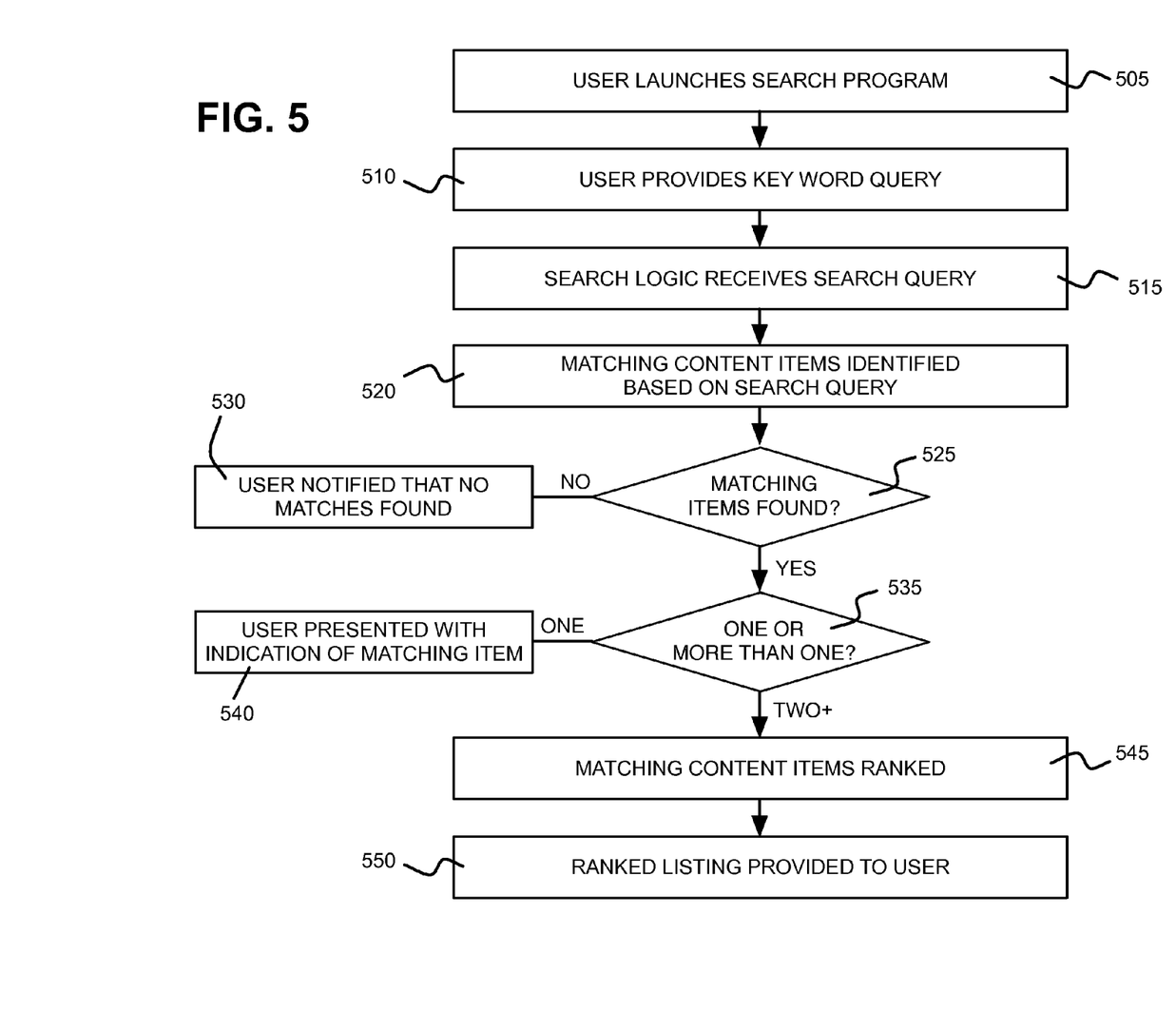
FIG. 5 is a flow diagram illustrating exemplary processing for searching currently airing program content based on one or more key words.

FIG. 5 is a flow diagram illustrating exemplary processing for searching currently airing program content based on one or more key words. Processing may begin with a user interfacing with output device 120 (e.g., a TV) and/or client device 110 (e.g., STB) to access or launch content search program 155 (block 505). Alternatively, the customer may use user device 140 (e.g., a smart phone or tablet computer) to access content search program 155.

In either case, after accessing or launching content search program 155, the user may interact with content search program 155 to provide a query that includes one or more key words indicative of the type of program content that the customer is trying to locate (block 510). For example, user interface logic 310 may provide a GUI that includes an input box for receiving one or more key words from the user. The user, via a keypad or control keys on remote control 130 (or user device 140), may interact with the GUI to enter the requested key words. In this example, assume that the user would like to search for program content in the suspense thriller category or genre. Therefore, assume that the user enters the search query "thriller" in the provided input box in the GUI.

Search logic 330 receives the search query (block 515). Search logic 330 then accesses database 320 to identify content items that match the term (or terms) in the received search query (block 520). As discussed above, the key words stored in database 320 may be defined as either global key words in field 406 or local key words in field 408. For example, search logic 330 may search table 400 in database 320 based on the search query "thriller" and may identify the content associated with entries 402-1 and 402-3 as including the key word "thriller."

Next, it is determined whether one or more content item has been found that matches the provided key words (block 525). If no matching content items have been found (block 525—NO), processing continues to block 530, where the user is notified that no results were found (e.g., via the GUI). However, if one or more content item is found that matches the provided key words (block 525—YES), it is then determined whether only one or more than one content item has been found (block 535). If only one matching content item has been found (block 535—ONE), the process continues to block 540 where an indication of the identified content item is provided to the user. For example, a description of the content item may be provided via the GUI. If more than one matching content item has been found (block 535—TWO+), processing continues to block 545 in which the matching content items are ranked to provide a ranked listing based on a determined relevance to the user's query. At block 550, the ranked listing of matching content items is provided to the user (e.g., via the GUI). Exemplary processing of block 545 is described in additional detail below in relation to FIG. 6.

Figure 6:
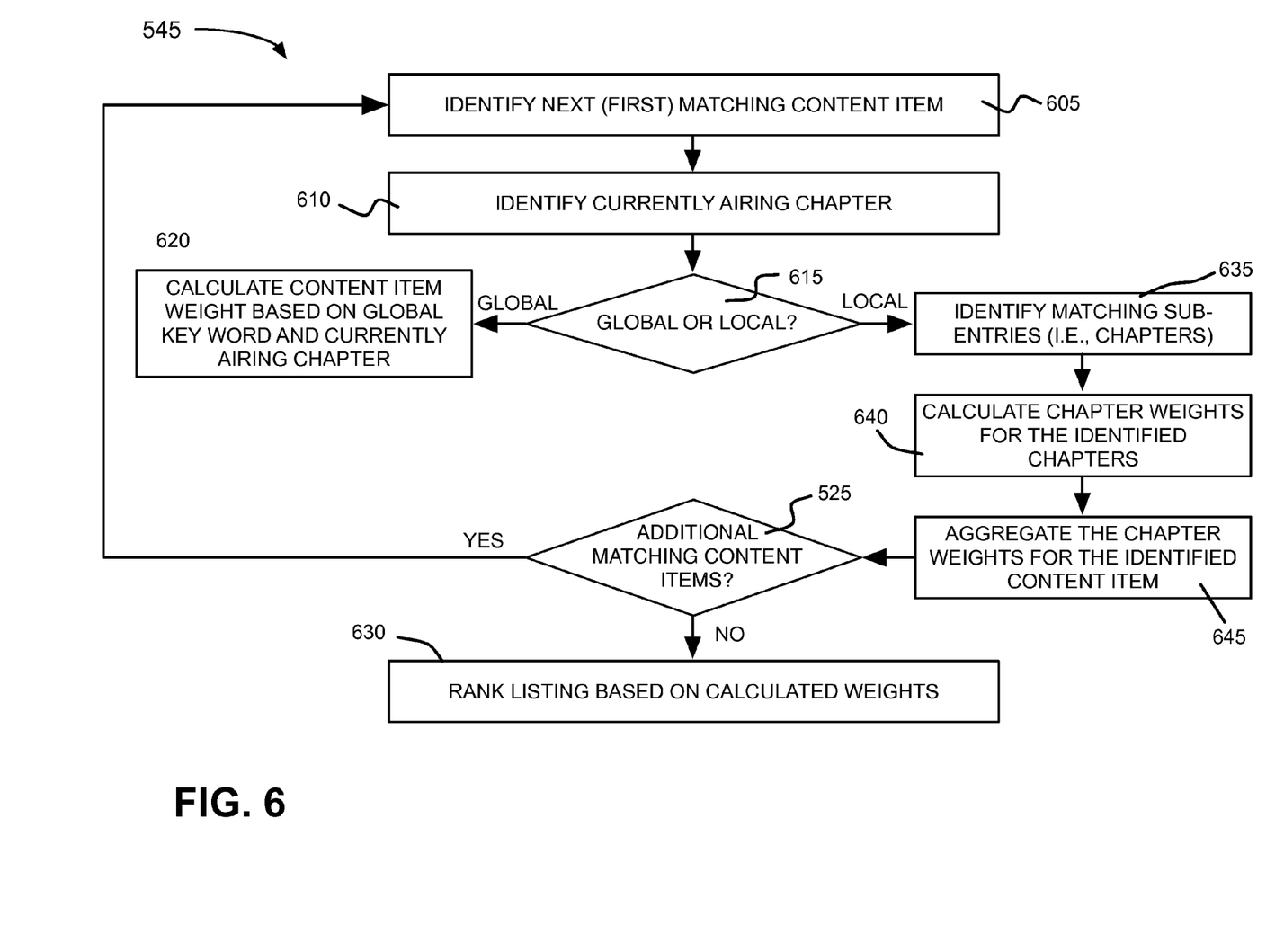
FIG. 6 is a flow diagram illustrating exemplary processing for ranking currently airing program content based on one or more key words identified in relation to the program content.

FIG. 6 is a flow diagram illustrating exemplary processing for ranking currently airing program content based on one or more key words identified in relation to the program content (e.g., block 545 described briefly above). As described above, the processing described in FIG. 6 may be performed by search logic 330 in the event that a key word search has identified more than one matching content item that is currently available for viewing. Processing may begin with an identification of a next (or first) matching content item (block 605). For example, using the "thriller" example described above, search logic 330 may identify a first entry 402-1.

Next, for the identified matching content item (e.g., entry 402-1), search logic 330 may determine a currently airing location or chapter within the content item (block 610). For example, search logic 330 may retrieve broadcast information relating the content item that indicates a start time and end time for the current broadcast of the content item. Such broadcast information may be retrieved, for example, from a program guide or the like. Search logic may then determine the current chapter by comparing the start and end times for the content to the relative start and end times associated with the content item entry 402 in table 400 (e.g., from fields 414 and 416 in table 400).

Next, search logic 330 may determine whether the matching key word is a global key word or a local key word with respect to the matching content item (block 615). If the matching key word is a global key word with respect to the matching content item (block 615—GLOBAL), search logic 330 may calculate a score associated with the content item based on the matching global key word and the currently airing chapter information (block 620). For example, the score for a content item having a matching global key word may be calculated such that the score for the content item is reduced as the current location within the content item progresses. Put more plainly, a matching global key word for a content item that has just begun (i.e., having a higher percentage of not yet aired content) is scored higher than a matching global key word for a content item that is half over (i.e., having a lower percentage of not yet aired content), which in turn is scored higher than a matching key word for a content item that is almost over (i.e., having a still lower percentage of not yet aired content). In one exemplary embodiment, this scoring methodology may be expressed as:

$$\text{score} = (n-p+1)/n, \quad (1)$$

where n represents a total number of chapters in the content item, and p represents the currently airing chapter. As shown, the score for content items having matching global key words can be seen as indirectly proportional to the currently airing chapter (p), such that as the currently airing chapter p increases, the corresponding score decreases.

Accordingly, for the "thriller" global key word example described above for entry 402-1, assume that the currently airing chapter is chapter 3 (of five total chapters). In this example, the score for the content item corresponding to entry 402-1 may be calculated as (5−3+1)/5, which equals 0.6 or 60%.

After a content item score has been calculated, processing continues to block 625 where it is determined whether additional matching content items (e.g., entries 402) have been identified. If additional matching entries remain to be scored (block 625—YES), the process returns to block 605 for identification of the next matching entry. However, if all matching entries have been scored (block 625—NO), search logic 330 ranks or orders the identified content items based on their respective scores (block 630).

Returning to block 615, when it is determined that the matching key word is a local key word (block 615—LOCAL), search logic 330 initially identifies sub-entries 408 corresponding to current content item entry 402 (identified in block 605) that have a matching local key word that corresponds to the currently airing chapter or a later in time chapter within the matching entry 402 (block 635). For example, assume that the key word query received from the user is "treasure hunt" and that the currently airing chapter is chapter 2 (e.g., identified in block 610). In this example, search logic 330 may identify sub-entries 408-3 and 408-4 as matching sub-entries concurrent with or following the currently airing chapter (i.e., chapter 3), since sub-entry 408-2, corresponding to currently airing chapter 2, does not include the matching key word "treasure hunt" in local key word field 412.

Next, search logic 330 calculates scores associated with the identified chapters (e.g., 3 and 4) in the content item based on the location of the chapters with the matching key word relative to the currently airing chapter (block 640). In this manner, chapters having matching key words are scored with a bias toward the currently airing location, to provide the most up-to-date relevant listing of content items to the user. Chapters without matching key words or chapters that have previously aired are scored as zero. In one exemplary embodiment, this scoring methodology for non-zero chapters may be expressed as:

$$\text{chapter}_q \text{score} = 1/(n+q-p), \quad (2)$$

where q represents the chapter being scored, n represents a total number of chapters in the content item, and p represents the number of the currently airing chapter. The difference (q-p) between the chapter being scored and the currently airing chapter may also be referred to as a relevance gap. Accordingly, for the "treasure hunt" example set forth above, the score for chapter 3 is expressed as $1/(5+3-2)$, where the total chapters in the content is 5, the chapter being scored is 3, and the currently airing chapter is 2. This calculation results in a score of 0.1667 or 16.7%. Similarly, the score for chapter 4 may expressed as $1/(5+4-2)$, which equals 0.143 or 14.3%. Effectively, as the chapter being scored is further separated in time from the currently airing chapter, the score for the chapter is reduced, thereby reducing the effect that key word matches in later chapters have on the overall score for the content item.

Next, search logic 330 aggregates the scores for each chapter in the content item to generate an aggregated content item score (block 645). In one exemplary embodiment, chapter score aggregation may be expressed as:

$$\text{score} = \sum_{i=1}^{n} \text{chapter}_i \text{score}, \quad (3)$$

where the individual chapter scores for each chapter in the content item (of n total chapters) are summed together.

For example, using the content item associated with entry 402-1 and the "treasure hunt" key word described above, where chapter 2 is the currently airing chapter, the total aggregated content item score is calculated as: chapter$_1$ score+chapter$_2$ score+chapter$_3$ score+chapter$_4$ score+chapter$_5$ score, or 0+0+16.7%+14.3%+0, which equals a total aggregated content item score of 31%.

After the aggregated content item score has been calculated, processing continues to block 625 where it is determined whether additional matching content items (e.g., entries 402) have been identified. If additional matching entries remain to be scored (block 625—YES), the process returns to block 605 for identification of the next matching entry. However, if all matching entries have been scored (block 635—NO), search logic 330 continues to block 630, described above.

Figure 7A:
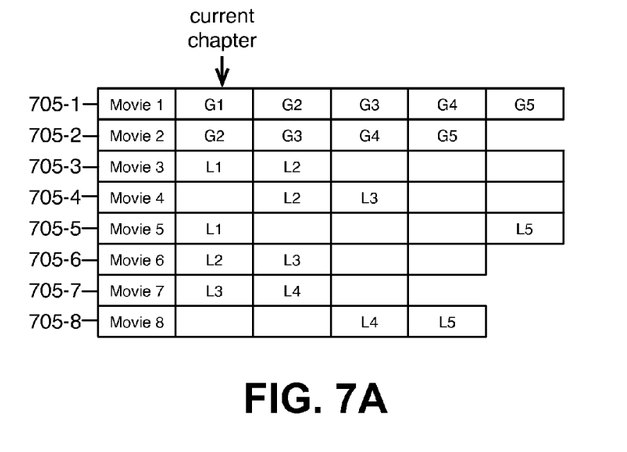
FIGS. 7A-7C depict tables that illustrate exemplary key word matches for a series of content items at different points in time based on the methodology described herein.
Figure 7B:
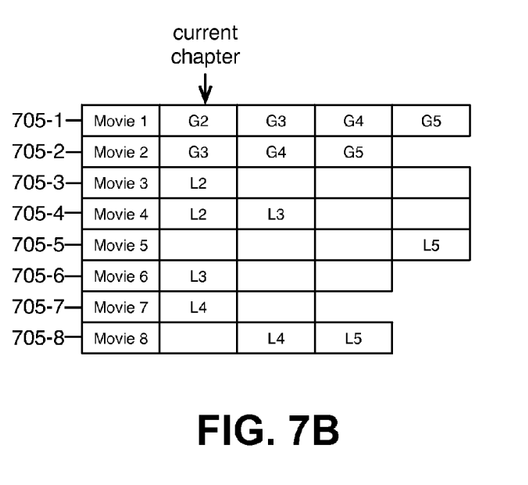
Figure 7C:
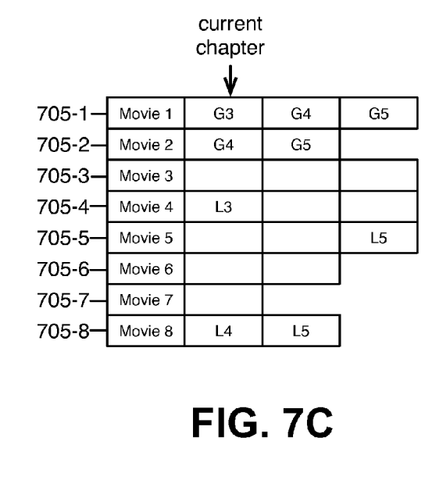

Based on the methodology described above, scores calculated for content items dynamically change based on the relative current playback position within the content item at the time of the ranking. Accordingly, a same key word query performed at a different time may result in a different ranking of matching content items. FIGS. 7A to 7C are tables that illustrate exemplary key word matches for a series of content items at different points in time.

More specifically, FIG. 7A illustrates eight content items 705-1 to 705-8 (i.e., Movie 1 to Movie 8) with a currently airing chapter at a first point in time, each of which include one or more chapters. For purposes of simplicity, all content items 705 are indicated as including five chapters, although any number of chapters may be associated with each content item. As shown, the chapters for each content item may be staggered with respect to each other. For example, chapter 1 for content item 705-1 may correspond in broadcast time to chapter 2 in content item 705-2, as shown in FIG. 7A. This accommodates typical program scheduling, in which content having different overall lengths and different chapter lengths may be airing simultaneously.

As shown in FIG. 7A, each matching key word for each content item may be indicated, in its respective chapter, by either a G for a global key word or an L for a local key word, followed by an indication of the chapter number with which it corresponds. Movie 1 (content item 705-1) is currently airing chapter 1 and includes a matching global key word G that associated with all chapters 1-5. Movie 2 (content item 705-2) is currently airing chapter 2 and also includes a matching global key word G associated therewith. Movie 3 (content item 705-3) is currently airing chapter 1 and includes a matching local key word L associated with chapters 1 and 2. Movie 4 (content item 705-4) is currently airing chapter 1 and includes matching local key word L associated with chapters 2 and 3. Movie 5 (content item 705-5) is currently airing chapter 1 and includes matching local key word L associated with chapters 1 and 5. Movie 6 (content item 705-6) is currently airing chapter 2 and includes matching local key word L associated with chapters 2 and 3. Movie 7 (content item 705-7) is currently airing chapter 3 and includes matching local key word L associated with chapters 3 and 4. Movie 8 (content item 705-8) is currently airing chapter 2 and includes matching local key word L associated with chapters 4 and 5.

Based on the exemplary methodology described above, each content item 705 may be scored based on 1) the type of matching key word identified (e.g., global or local), and 2) the relative proximity in time of the current location in the content item to the matching portion or portions of the content item.

In one embodiment, for content items 705-1 and 705-2 in which a matching global key word has been identified (e.g., block 615—GLOBAL), scores for the content items may be calculated using equation (1) described above. Accordingly, for content item 705-1 (Movie 1), the score may be calculated as (5−1+1)/5 or 100%. Similarly, for content item 705-2 (Movie 2), the score may be calculated as (5−2+1)/5 or 80%.

For content items 705-3 to 705-8 in which a matching local key word has been identified in at least one chapter (e.g., block 615—LOCAL), aggregated chapter scores for the content items may be calculated using equations (2) and (3) described above. Accordingly, for content item 705-3 (Movie 3), the individual chapter scores for chapters 1 and 2 (the chapters having the matching key word) score may be calculated as 20% and 16.7%, respectively. Collectively, given that chapters without matching key words associated therewith are scored as 0, the aggregate score for content item 705-3 is calculated as 20+16.6%=36.7%. Scores for content items 705-4 to 705-8 may be similarly calculated, resulting in scores of 31% for content item 705-4 (Movie 4), 31.1% for content item 705-5 (Movie 5), 36.7% for content item 705-6 (Movie 6), 36.7% for content item 705-7 (Movie 7), and 26.8% for content item 705-8 (Movie 8).

Following score calculation for all content items 705, the content items are ranked based on the calculated scores. Using the values calculated in the example of FIG. 7A, at the first point in time the content items are ranked as follows:

1.) Movie 1 (100%)
2.) Movie 2 (80%)
3.) Movie 3, Movie 6, Movie 7 (36.7%)
4.) Movie 5 (31.1%)
5.) Movie 4 (31%)
6.) Movie 8 (26.8%)

As described above, content items 705 may then be displayed (block 550) in this ranked manner. For example, the movies or content items having a score that exceeds a particular threshold (e.g., 15%, 25%, 50%, etc.), may be ranked and/or displayed graphically. In some embodiments, the threshold applied may be configurable by a user or the service provider. In other implementations, a ranked listing of all matching content items may be provided.

FIG. 7B illustrates the same set of content items at a second point in time that is one chapter advanced from the first point in time. For example, assume that a user entered the same search query (key words) as represented in FIG. 7A, simply at a later point in time. As shown, at this second point in time, Movie 1 (content item 705-1) is currently airing chapter 2 and includes a matching global key word G. Movie 2 (content item 705-2) is currently airing chapter 3 and also includes a matching global key word G associated therewith. Movie 3 (content item 705-3) is currently airing chapter 2 and includes a matching local key word L associated with chapter 2. Movie 4 (content item 705-4) is currently airing chapter 2 and includes matching local key word L associated with chapters 2 and 3. Movie 5 (content item 705-5) is currently airing chapter 2 and includes matching local key word L associated with chapter 5. Movie 6 (content item 705-6) is currently airing chapter 3 and includes matching local key word L associated with chapter 3. Movie 7 (content item 705-7) is currently airing chapter 4 and includes matching local key word L associated with chapter 4. Movie 8 (content item 705-8) is currently airing chapter 3 and includes matching local key word L associated with chapters 4 and 5.

As described above, each content item 705 may be scored based on 1) the type of matching key word identified (e.g., global or local), and 2) the relative proximity in time of the current location in the content item to the matching portion or portions of the content item.

In one embodiment, for content items 705-1 and 705-2 in which a matching global key word has been identified (e.g., block 615—GLOBAL), scores for the content items may be calculated using equation (1) described above. Accordingly, for content item 705-1 (Movie 1), the score may be calculated as (5−2+1)/5 or 80%. Similarly, for content item 705-2 (Movie 2), the score may be calculated as (5−3+1)/5 or 60%.

For content items 705-3 to 705-8 in which a matching local key word has been identified in at least one chapter (e.g., block 615—LOCAL), aggregated chapter scores for the content items may be calculated using equations (2) and (3) described above. Accordingly, for content item 705-3 (Movie 3), the chapter score for chapter 2 (the remaining chapter that includes a matching key word) may be calculated as 1/(5+2−

2)=20%, respectively. Given that no remaining chapters of item 705-3 include matching key words, the total aggregate score for content item 705-3 is calculated as 0+20+0+0+0=20%. Scores for content item 705-4 to 705-8 may be similarly calculated, resulting in scores of 36.7% for content item 705-4 (Movie 4), 12.5% for content item 705-5 (Movie 5), 20% for content item 705-6 (Movie 6), 20% for content item 705-7 (Movie 7), and 31% for content item 705-8 (Movie 8).

Following score calculation for all content items 705 at the second point in time, the content items are ranked based on the calculated scores. Using the values calculated in the example of FIG. 7B at the second point in time, the content items are ranked as follows:
1.) Movie 1 (80%)
2.) Movie 2 (60%)
3.) Movie 4 (36.7%)
4.) Movie 8 (31%)
5.) Movie 3, Movie 6, Movie 7 (20%)
6.) Movie 5 (12.5%)

As described above, content items 705 may then be displayed (block 550) in this, or another, ranked manner.

FIG. 7C illustrates the same set of content items at a third point in time that is one chapter advanced from the second point in time (and two chapters advanced from the first point in time). For example, assume that a user entered the same search query (key words) as represented in FIGS. 7A and 7B, at a still later point in time. As shown, at this third point in time, Movie 1 (content item 705-1) is currently airing chapter 3 and includes a matching global key word G and Movie 2 (content item 705-2) is currently airing chapter 4 and also includes a matching global key word G associated therewith. Movie 3 (content item 705-3) is currently airing chapter 3 and does not include any current or future chapters that include matching key words. Movie 4 (content item 705-4) is currently airing chapter 3 and includes matching local key word L associated with chapter 3. Movie 5 (content item 705-5) is currently airing chapter 3 and includes matching local key word L associated with chapter 5. Movie 6 (content item 705-6) is currently airing chapter 4 and does not include any current or future chapters that include matching key words. Movie 7 (content item 705-7) is currently airing chapter 5 and also does not include any current or future chapters that include matching key words. Movie 8 (content item 705-8) is currently airing chapter 4 and includes matching local key word L associated with chapters 4 and 5.

As described above, each content item 705 may be scored based on 1) the type of matching key word identified (e.g., global or local), and 2) the relative proximity in time of the current location in the content item to the matching portion or portions of the content item.

In one embodiment, for content items 705-1 and 705-2 in which a matching global key word has been identified (e.g., block 615—GLOBAL), scores for the content items may be calculated using equation (1) described above. Accordingly, for content item 705-1 (Movie 1), the score may be calculated as (5−3+1)/5 or 60%. Similarly, for content item 705-2 (Movie 2), the score may be calculated as (5−4+1)/5 or 40%.

For content items 705-3 to 705-8 in which no matching local key words are found for current or future chapters, these scores are set to 0. Accordingly, content items 705-3 (Movie 3), 705-6 (Movie 6), and 705-7 (Movie 7) are assigned scores of 0 and consequently dropped from the final ranked list. Aggregated chapter scores for the remaining local key word matching content items may be calculated using equations (2) and (3) described above. Accordingly, for content item 705-4 (Movie 4), the chapter score for chapter 3 (the remaining chapter that includes a matching key word) may be calculated as 1/(5+3−3)=20%. Given that no remaining chapters of item 705-4 include matching key words, the total aggregate score for content item 705-4 is calculated as 0+0+20+0+0=20%. Scores for content item 705-5 and 705-8 may be similarly calculated, resulting in scores of 14.3% for content item 705-5 (Movie 5) and 36.7% for content item 705-8 (Movie 8).

Following score calculation for all remaining matching content items 705 at the third point in time, the content items are ranked based on the calculated scores. Using the values calculated in the example of FIG. 7C at the third point in time, the content items are ranked as follows:
1.) Movie 1 (60%)
2.) Movie 2 (40%)
3.) Movie 8 (36.7%)
4.) Movie 4 (20%)
5.) Movie 5 (14.3%)

As illustrated above, the methodology described herein allows for dynamically modified relevancy rankings at different points in time during the airing of content items. This approach allows for accurate up-to-the-minute search results that help to provide customers with a more satisfying viewing experience.

Implementations described herein relate to searching for programming content. As described above, a service provider may store key words or terms associated with available content as one of two types of key words, either global key words that apply to an entire content item, or local key words that apply to one or more chapters (e.g., portions of time) within particular content items. The service provider may then determine whether one or more terms in a search query received from a user matches one of the key words/terms. The service provider weighs or scores the content items having matching key words to generate a ranked listing which is then provided to the user for selection of a particular content item for viewing.

As described above, in some embodiments, the content items are scored based on the type of matching key word (e.g., global or local key word), and the currently airing chapter relative to the matching key words. For example, for global key words, content items having a relatively longer remaining portion are scored more highly than content items with a relatively shorter remaining portion. Further, for matching local (e.g., chapter-specific) key words, the current or future individual chapters that have the matching local key words are scored and aggregated based on, for example, the distance in time from or proximity to the currently airing chapter.

Alternatively, the effect of the currently airing chapter may be replaced by a future time indicated by a user. For example, a user input may shift the current chapter interval to a next chapter and the content items may be scored with a bias toward a proximity to the next chapter. In this manner, the scoring may be relevant to a delay in the user's anticipated viewing time.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 5 and 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, from a user device, a search query associated with identifying a plurality of currently airing media content items available from a service provider;
   searching a database of key words associated with a plurality of media content items to identify a set of media content items having key words associated therewith that match the search query;
   determining a currently airing portion of each of the plurality of media content items in the set of media content items;
   determining, for each media content item in the set of media content items, whether the matching key word is a global key word representative of the media content item in its entirety, or a local key word representative of one or more portions of the media content item;
   scoring the set of media content items based on the currently airing portion and the determining of whether the matching key word is a global keyword or a local key word;
   ranking the set of media content items based on the scoring; and
   transmitting a listing of the ranked set of media content items to the user device for display to a user.

2. The method of claim 1,
   wherein the database further comprises a plurality of entries corresponding to the plurality of media content items available from the service provider,
   wherein each of the plurality of entries includes one or more sub-entries corresponding to portions of the respective media content item.

3. The method of claim 2, wherein local key words for the plurality of media content items are stored in the sub-entries corresponding to the one or more portion of the media content item that local key word represents.

4. The method of claim 1, wherein,
   when it is determined that the matching key word for a particular media content item in the set of media content items is a global key word, calculating the score for the particular media content item based on the currently airing portion of the particular media content item relative to a total length of the particular media content item.

5. The method of claim 4, wherein a score for a media content item having a higher percentage of not yet aired content is higher than a score for a media content item having a lower percentage of not yet aired content.

6. The method of claim 4, wherein calculating the score for the particular media content item is expressed as:

$$\text{score}=(n-p+1)/n$$

where n is an integer representing a total number of portions in the particular media content item and p is an integer representing the currently airing portion.

7. The method of claim 4, further comprising:
   when it is determined that the matching key word for a particular media content item in the set of media content items is a local key word, performing:
      calculating a score for each portion of the particular media content item; and
      aggregating the calculated scores to generate a score for the particular media content item.

8. The method of claim 7,
   wherein the score for a particular portion of the particular media content item that has a matching local key word associated therewith is calculated based on a number of portions of the particular media content item between the currently airing portion and the particular portion of the particular media content item relative to a total length of the particular media content item.

9. The method of claim 8, wherein calculating the score for the particular portion of the particular media content item is expressed as:

$$\text{chapter}_q \text{ score}=1/(n+q-p),$$

where n is an integer representing a total number of portions in the particular media content item and p is an integer representing the currently airing portion, and q is an integer representing the particular portion of the particular media content item.

10. The method of claim 7, further comprising:
    setting scores for previously aired portions of the particular media content item and portions of the particular media content item that do not have a matching local key word associated therewith to zero.

11. The method of claim 7, wherein ranking the set of media content items is based on the calculated scores.

12. The method of claim 1, further comprising:
    dynamically scoring the set of media content items that have a matching key word associated therewith based on a currently airing portion of each media content item relative to the one or more portions of the set of media content items that have a matching key word associated therewith; and
    ranking the set of media content items based on the dynamic scoring, such that the ranking of the set of media content items at a first point in time can be different than the ranking of the set of media content items at a second point in time.

13. A system, comprising:
    a memory configured to store a database of key words associated with a plurality of media content items, wherein the database further comprises a plurality of entries corresponding to the plurality of media content items available from a service provider, and wherein each of the plurality of entries includes one or more sub-entries corresponding to chapters within the respective media content item; and at least one processor to:
  receive, from a user, a search query associated with identifying a plurality of currently airing media content items available from a service provider;
  search the database to identify a set of media content items having key words associated therewith that match the search query;
  determine a currently airing chapter of each of a plurality of media content items in the set of media content items;
  determine, for each media content item in the set of media content items, whether the matching key word is a global key word representative of the media content item in its entirety, or a local key word representative of one or more chapters within the media content item;
  score each media content item in the set of media content items based on the currently airing chapter and the determination of whether the matching key word is a global key word or a local key word;
  rank the set of media content items based on the scores; and
  provide a listing of the ranked set of media content items to a user device for display to the user.

14. The system of claim 13, wherein local key words for the plurality of media content items are stored in the sub-entries.

15. The system of claim 13, wherein the processor is further to:
  when it is determined that the matching key word for a particular media content item in the set of media content items is a global key word, calculate the score for the particular media content item based on the currently airing chapter of the particular media content item relative to a total number of chapters in the particular media content item; and
  when it is determined that the matching key word for a particular media content item in the set of media content items is a local key word:
    calculate a score for each matching chapter of the particular media content item based on the proximity of the currently airing chapter to each matching chapter; and
    aggregate the calculated scores for each of the matching chapters to generate the score for the particular media content item.

16. The system of claim 15, wherein a score for a media content item having a higher percentage of not yet aired content is higher than a score for a media content item having a lower percentage of not yet aired content.

17. The system of claim 15,
  wherein the score for a particular matching chapter of the particular media content item that has a matching local key word associated therewith is calculated based on a number of chapters between the currently airing chapter and the particular matching chapter relative to a total length of the particular media content item.

18. The system of claim 15, wherein the processor is further configured to:
  when it is determined that the matching key word for a particular media content item in the set of media content items is a local key word:
    set to zero scores for previously aired chapters of the particular media content item and chapters of the particular media content item that do not have a matching local key word associated therewith.

19. A non-transitory computer-readable medium having stored thereon sequences of instructions which, when executed by at least one processor, cause the at least one processor to:
  receive, from a user device, a search query associated with identifying a plurality of currently airing media content items available from a service provider;
  search a database of key words associated with a plurality of media content items to identify a set of media content items having key words associated therewith that match the search query;
  determine a currently airing portion of each of the plurality of media content items in the set of media content items;
  determine, for each media content item in the set of media content items, whether the matching key word is a global key word representative of the media content item in its entirety, or a local key word representative of one or more portions of the media content item;
  score the set of media content items based on the currently airing portion and the determination of whether the matching key word is a global key word or a local key word;
  generate a ranked listing based on the scores of the set of media content items; and
  transmit the ranked listing to the user device for display to a user.

20. The non-transitory computer-readable medium of claim 19, wherein the instructions further cause the at least one processor to:
  calculate, when the key word is a global key word, the score for the particular media content item based on the currently airing portion of the particular media content item relative to a total length of the particular media content item; and
  calculate, when the key word is a local key word, the score for the particular media content item based on gaps between the currently airing portion of the particular media content item and portions of the particular media content having matching local key words, relative to the total length of the particular media content item.

* * * * *